US009588728B2

(12) United States Patent
Lin et al.

(10) Patent No.: US 9,588,728 B2
(45) Date of Patent: Mar. 7, 2017

(54) MOBILE DISPLAY SYSTEM AND MOBILE DISPLAY DEVICE

(71) Applicant: E Ink Holdings Inc., Hsinchu (TW)

(72) Inventors: Chin-Wen Lin, Hsinchu (TW); Chien-Chung Huang, Hsinchu (TW); Wei-Juin Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/497,302

(22) Filed: Sep. 25, 2014

(65) Prior Publication Data

US 2015/0205562 A1    Jul. 23, 2015

(30) Foreign Application Priority Data

Jan. 17, 2014  (TW) .............................. 103101825 A

(51) Int. Cl.
*G06F 3/14*       (2006.01)
*H02J 7/00*       (2006.01)
*H02J 17/00*      (2006.01)
*G06F 1/16*       (2006.01)
*G06F 1/32*       (2006.01)

(52) U.S. Cl.
CPC .......... *G06F 3/1423* (2013.01); *G06F 1/1626* (2013.01); *G06F 1/3203* (2013.01); *H02J 7/0054* (2013.01); *H02J 17/00* (2013.01); *G09G 2330/02* (2013.01); *G09G 2340/145* (2013.01); *G09G 2370/16* (2013.01)

(58) Field of Classification Search
CPC .............. G06F 3/1423; G09G 2330/02; G09G 2340/145; G09G 2370/16
See application file for complete search history.

(56) References Cited

U.S. PATENT DOCUMENTS 8,380,998 B2   2/2013   Azancot et al.
2008/0111518 A1   5/2008   Toya
(Continued)

FOREIGN PATENT DOCUMENTS

CN     103338281 A  * 10/2013  ............ H04M 19/04
TW     M359881 U    6/2009
TW     I393046 B    4/2013

OTHER PUBLICATIONS

Machine translation of CN 103338281 A.*
(Continued)

*Primary Examiner* — Michael Pervan
(74) *Attorney, Agent, or Firm* — CKC & Partners Co., Ltd.

(57) ABSTRACT

A mobile display system includes a first mobile display device and a second mobile display device. The first mobile display device includes a first power storage module, a first screen, and a wireless power transmitter. The first screen is configured to display a first image by using the power stored in the first power storage module. The second mobile display device includes a second power storage module, a second screen, and a wireless power receiver. The second screen is configured to display a second image by using the power stored in the second power storage module. During a period when the first power storage module is charged, the wireless power transmitter provides a first wireless power signal to the wireless power receiver, so as to charge the second power storage module by the first wireless power signal.

5 Claims, 2 Drawing Sheets

(56) References Cited

U.S. PATENT DOCUMENTS

| | | |
|---|---|---|
| 2011/0050164 A1 | 3/2011 | Partovi |
| 2011/0260681 A1 | 10/2011 | Guccione et al. |
| 2011/0285348 A1 | 11/2011 | Hong |
| 2012/0098484 A1 | 4/2012 | Cheng et al. |
| 2012/0187903 A1 | 7/2012 | Tabata et al. |
| 2013/0038278 A1 | 2/2013 | Park et al. |
| 2013/0076653 A1 | 3/2013 | Selim |
| 2013/0093388 A1 | 4/2013 | Partovi |
| 2013/0220847 A1 | 8/2013 | Fisher |
| 2013/0285604 A1 | 10/2013 | Partovi |
| 2014/0306646 A1* | 10/2014 | Liu ................. H02J 7/025 320/103 |

OTHER PUBLICATIONS

Corresponding Taiwanese Office Action that these art references were cited.
Corresponding Chinese Office Action that this art reference was cited on Jul. 5, 2016.
Corresponding Taiwanese Office Action that this art reference was cited on Sep. 23, 2016.

* cited by examiner

MOBILE DISPLAY SYSTEM AND MOBILE DISPLAY DEVICE

This application claims priority to Taiwanese Application Serial Number 103101825, filed Jan. 17, 2014, which is herein incorporated by reference.

BACKGROUND

Field of Invention

The present invention relates to an electronic system and an electronic device. More particularly, the present invention relates to a mobile display system and a mobile display device.

Description of Related Art

With advances in electronic technology, mobile display devices, such as tablet computers and mobile phones, are widely used in our daily lives.

A typical mobile display device includes a battery and a display screen. The display screen is configured to display an image by using the power provided by the battery, so that a user can control the device according to the image. In some applications, the mobile display device can display an additional image by an external display screen to provide additional information. However, with such configurations including an external display screen, the power of the battery of the mobile device will be exhausted rapidly.

SUMMARY

In view of the problem described above, one aspect of the present disclosure is related to a mobile display system. In accordance with one embodiment of the present disclosure, the mobile display system includes a first mobile display device and a second mobile display device. The first mobile display device includes a first power storage module, a first screen, and a wireless power transmitter. The first screen is configured to display a first image by using the power stored in the first power storage module. The second mobile display device includes a second storage module, a second screen, and a wireless power receiver. The second screen is configured to display a second image by using the power stored in the second power storage module. In a first charging mode, during a period when the first power storage module is charged, the wireless power transmitter provides a first wireless power signal to the wireless power receiver, so as to charge the second power storage module by the first wireless power signal.

In accordance with one embodiment of the present disclosure, in a second charging mode, the wireless power transmitter provides a second wireless power signal to the wireless power receiver based on the power stored in the first power storage module, so as to charge the second power storage module by the second wireless power signal.

In accordance with one embodiment of the present disclosure, the wireless power transmitter and the wireless power receiver are disposed opposing each other, so as to reduce an attenuation of the first wireless power signal.

In accordance with one embodiment of the present disclosure, the second mobile display device further includes a protective case configured to cover and protect the first mobile display device.

In accordance with one embodiment of the present disclosure, the second screen is disposed on a first side of the protective case, the wireless power receiver is disposed on a second side of the protective case adjacent to the first mobile display device, and the first side and the second side are opposite to each other.

Another aspect of the present disclosure is related to a mobile display system. In accordance with one embodiment of the present disclosure, the mobile display system includes a mobile display device and a protective device. The mobile display device includes a housing, a first screen, a first battery, and a wireless power transmitter. The first screen is disposed on the housing. The first battery is disposed in the housing. The wireless power transmitter is disposed in the housing. The protective device includes a protective case, a second screen, a second battery, and a wireless power receiver. The protective case is configured to cover the housing to protect the mobile display device. The second screen is disposed on a first side of the protective case. The second battery is disposed on the protective case. The wireless power receiver is disposed on a second side of the protective case. The first side and the second side are opposite to each other.

In accordance with one embodiment of the present disclosure, the wireless power transmitter and the wireless power receiver are disposed opposing each other, so as to reduce an attenuation between the wireless power transmitter and the wireless power receiver.

In accordance with one embodiment of the present disclosure, an interval between the second screen and the first mobile display device is greater than an interval between the wireless power receiver and the first mobile display device.

Another aspect of the present disclosure is related to a mobile display device. In accordance with one embodiment of the present disclosure, the mobile display device includes a first battery and a wireless power transmitter. In a first charging mode, during a period when the first battery is charged, the wireless power transmitter provides a first wireless power signal to a wireless power receiver of a protective device, so as to make a second battery of the protective device be charged by the first wireless power signal.

In accordance with one embodiment of the present disclosure, in a second charging mode, the wireless power transmitter provides a second wireless power signal to the wireless power receiver of the protective device based on the power stored in the first battery, so as to charge the second battery of the protective device by the second wireless power signal.

Through an application of one embodiment described above, the second screen can display the second image by using the power stored in the second power storage module, such that the rapid exhaustion of the power stored in the first storage module can be avoided. In addition, when the first power storage module of the first mobile device is charged, the second power storage module of the second mobile device can be charged simultaneously.

Hence, use of such a mobile display system is convenient since there is no need to separately charge the first power storage module and the second power storage module.

DETAILED DESCRIPTION

Figure 1:
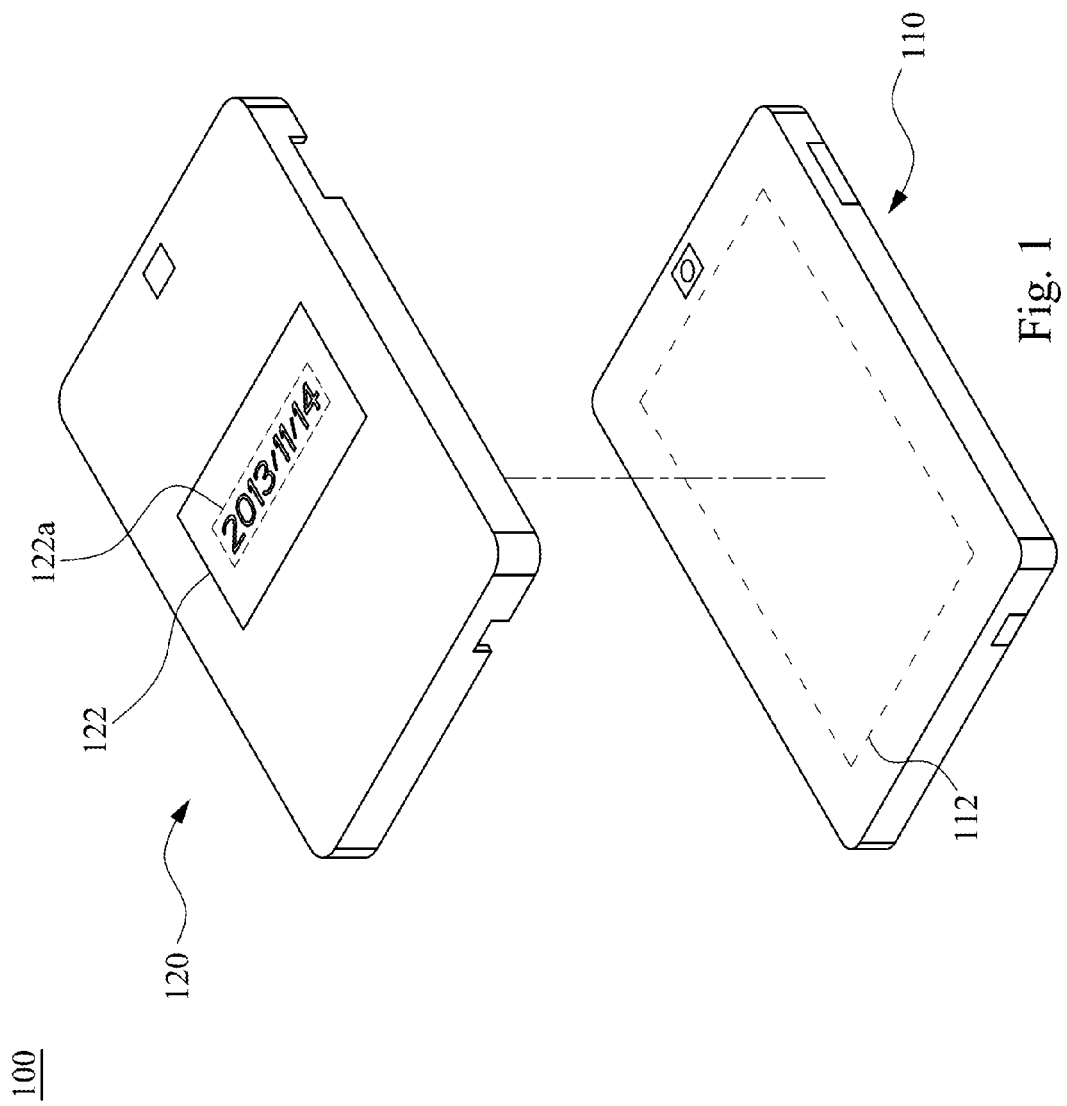
FIG. 1 is a schematic diagram of a mobile display system according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the invention.

It will be understood that, in the description herein and throughout the claims that follow, when an element or layer is referred to as being "disposed on," "connected to" or "coupled to" another element or layer, it can be directly disposed on, connected or coupled to the other element or layer or intervening elements, or layers may be present. In contrast, when an element is referred to as being "directly on," "directly connected to" or "directly coupled to" another element or layer, there are no intervening elements or layers present. It is further noted that like numbers refer to like elements throughout.

It will be understood that, in the description herein and throughout the claims that follow, although the terms first, second, etc. may be used to describe various elements, these elements should not be limited by these terms. These terms are only used to distinguish one element from another. For example, a first element could be termed a second element, and, similarly, a second element could be termed a first element, without departing from the scope of the embodiments.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

FIG. 1 is a schematic diagram of a mobile display system 100 according to one embodiment of the present invention.

In this embodiment, the mobile display system 100 includes a first mobile display device 110 and a second mobile display device 120. In this embodiment, the first mobile display device 110 can be, for example, a mobile phone or a tablet computer. The second mobile display device 120 can be, for example, a protective device configured to protect the mobile phone or the tablet computer. It is noted that the aspects of the mobile display device 110 described above are given for illustrative purposes, and the present disclosure is not limited in this regard.

In this embodiment, the mobile display device 110 includes a first screen 112. The second mobile display device 120 includes a second screen 122. The first screen 112 can be, for example, an active matrix organic light emitting diode screen or a liquid crystal display screen, but is not limited in this regard. The second screen 122 can be, for example, an e-paper screen, but is not limited in this regard.

In this embodiment, the first screen 112 is configured to display a first image (not shown), so that a user can control the first mobile display device 110. The second screen 122 is configured to display a second image 122a different from the first image, so as to provide additional information to the user. In FIG. 1, the second image 122a is the date "2013/11/14" by way of example, but the invention is not limited to such an example. In some embodiments, the second image 122a can be a map or a brief message(s).

Through the configuration described above, the number of different types of applications for the mobile display system 100 can be increased. However, in practice, if the second mobile display device 120 do not have an independent power source, the power stored in the first mobile display device 110 would be exhausted rapidly. On the other hand, if the second mobile display device 120 has an independent power source, the first mobile display device 110 and second mobile display device 120 would need to be charged separately, causing inconvenience for users.

Thus, one embodiment of the mobile display system 100 of the present invention is provided to overcome such problems.

Figure 2:
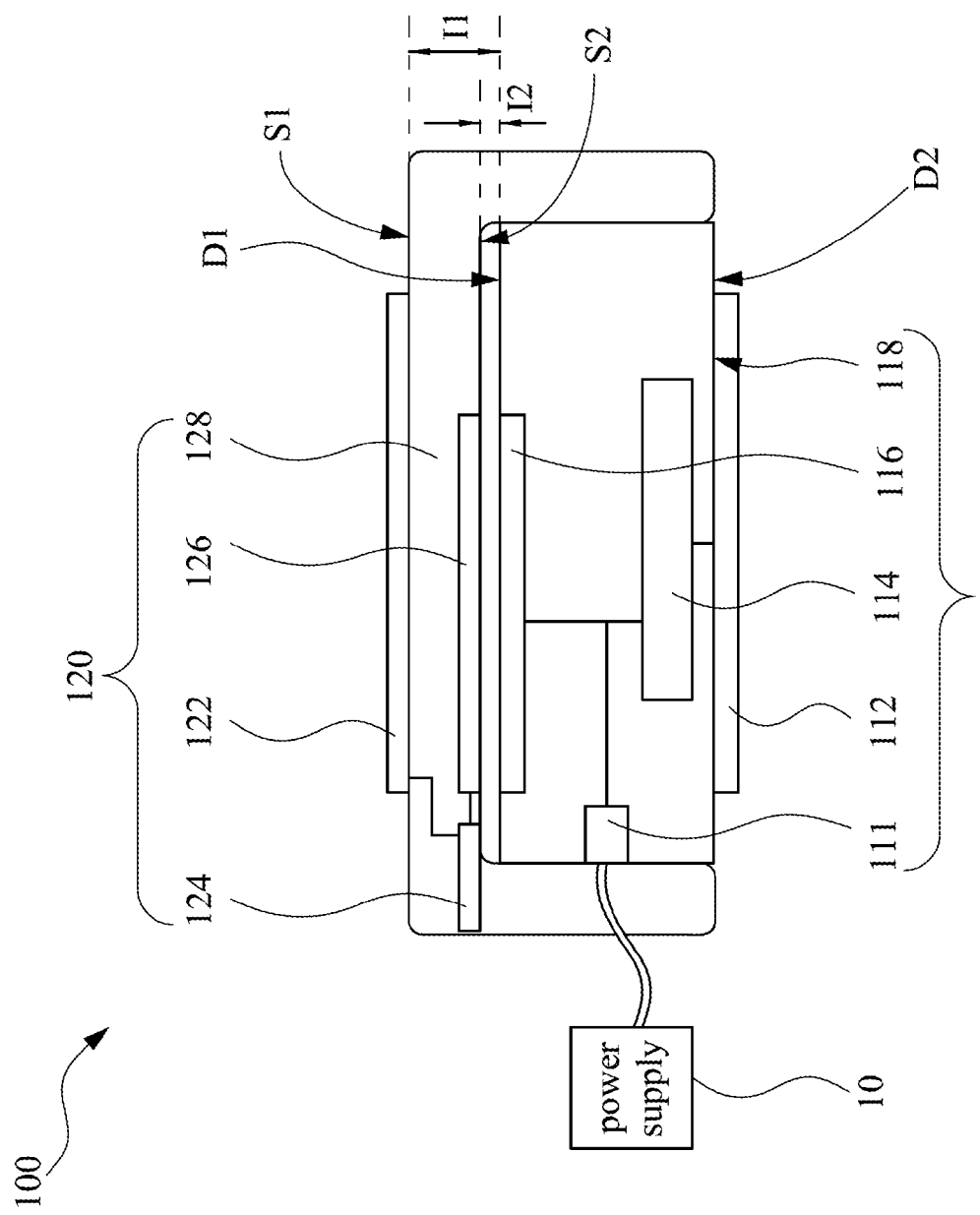
FIG. 2 is a sectional view of the mobile display system of FIG. 1.

Reference is also made to FIG. 2 which is a sectional view of the mobile display system 100 of FIG. 1.

In addition to the first screen 112 described above, in this embodiment, the first mobile display device 110 further includes a charging hole 111, a first power storage module 114, a wireless power transmitter 116, and a housing 118. The first power storage module 114 can be, for example, a battery. The wireless power transmitter 116 can be, for example, a coil. The housing 118 is fabricated, for example, by plastic or partly by plastic and partly by metal.

The charging hole 111 is formed in the housing 118, and is electrically connected to the first power storage module 114 and the wireless power transmitter 116. The first screen 112 is disposed on the housing 118, and is electrically connected to the first power storage module 114. The first power storage module 114 and the wireless power transmitter 116 are disposed in the housing 118. The first power storage module 114 and the wireless power transmitter 116 are electrically connected to each other.

In this embodiment, the wireless power transmitter 116 is disposed on, for example, a first side D1 of the housing 118. The first screen 112 is disposed on, for example, a second side D2 of the housing 118. The first side D1 of the housing 118 and the second side D2 of the housing 118 are opposite to each other.

In addition to the second screen 122 described above, the second display device 120 further includes a second power storage module 124, a wireless power receiver 126, and a protective case 128. The second power storage module 124 can be, for example, a battery. The wireless power receiver 126 can be, for example, a coil. The protective case 128 can be fabricated by, for example, resilient rubber. The protective case 128 is configured to cover the housing 118 of the first mobile display device 110, so as to protect the first mobile display device 110.

The second power storage module 124 is disposed on (or embedded in) the protective case 128 and electrically connected to the second screen 122 and the wireless power receiver 126. The second screen 122 is disposed on a first side S1 of the protective case 128. The wireless power receiver 126 is disposed on a second side S2 of the protective case 128. The first side S1 of the protective case 128 and the second side S2 of the protective case 128 are opposite to each other.

In this embodiment, the first side S1 of the protective case 128 can be, for example, a side of the protective case 128 which is away from the first mobile display device 110, and the second side S2 of the protective case 128 can be, for example, a side of the protective case 128 which is adjacent to the first mobile display device 110. An interval (or spacing) 11 between the second screen 122 disposed on the first side S1 of the protective case 128 and the first mobile display device 110 is greater than an interval (or spacing) 12 between the wireless power receiver 126 disposed on the second side S2 of the protective case 128 and the first mobile display device 110.

It is noted that the interval 11 and the interval 12 are merely used to described the positional relationship among the second screen 122, the wireless power receiver 126, and the first mobile display device 110 in one embodiment, and the invention is not limited to this embodiment. In addition, in one embodiment, the interval 12 may be equal to zero. That is, the wireless power receiver 126 and the first mobile display device 110 may contact to each other.

In this embodiment, the first screen 112 is configured to display the first image by using the power stored in the first power storage module 114, so that a user can control the first mobile display device 110 according to the first image. The second screen 122 is configured to display the second image 122a by using the power stored in the second power storage module 124, so as to provide additional information.

In a first charging mode, the first mobile display device 110 can be electrically connected to a power supply 10 through the charging hole 111, so as to charge the first power storage module 114 using the power received from the power supply 10 through the charging hole 111. In addition, during a period when the first power storage module 114 is charged by the power received through the charging hole 111, the wireless power transmitter 116 also receives the power through the charging hole 111 and provides a first wireless power signal to the wireless power receiver 126. The wireless power receiver 126 receives the first wireless power signal, converts the first wireless power signal into electrical energy, and provides the electrical energy to the second power storage module 124, such that the second power storage module 124 can be charged by the first wireless power signal.

During such operation, the first power storage module 114 and the second power storage module 124 can be charged simultaneously, such that the user inconvenience associated with charging the first and second power storage modules 114, 124 separately can be avoided. In addition, by using the second power storage module 124 disposed in the second mobile display device 120, the power stored in the first power storage module 114 is not also used for the second screen 122, such that the rapid exhaustion of the power stored in the first power storage module 114 can be avoided.

It is noted that in the first charging mode described above, the first power storage module 114 can also be charged through, for example, a solar panel or a wireless charging device, and the manner of charging the first power storage module 114 is not limited to the embodiment described above.

In addition, in one embodiment of the present disclosure, in a second charging mode, the first mobile display device 110 can also control the wireless power transmitter 116 through a controller (not shown) to provide a second wireless power signal to the wireless power receiver 126 based on the power stored in the first power storage module 114, so as to charge the second power storage module 124 by the second wireless signal (i.e., by the power stored in the first power storage module 114). It should be noted that the second charging mode described above can be activated during a period when the first power storage module 114 is being charged or when the first power storage module 114 is not being charged.

In such a manner, even if the power stored in the second power storage 124 is exhausted before the power stored in the first power storage 114, the second power storage module 124 can still acquire some power stored in the first power storage module 114 to drive the second screen 122.

In addition, according to one embodiment of the present invention, the wireless power transmitter 116 and the wireless power receiver 126 can be disposed opposing each other to make the interval between the wireless power transmitter 116 and the wireless power receiver 126 as short as possible, so as to reduce attenuations of the signals transmitted between the wireless power transmitter 116 and wireless power receiver 126 (i.e., to reduce the attenuations of the first wireless power signal and the second wireless power signal transmitted from the wireless power transmitter 116 and received by the wireless power receiver 126).

For example, the wireless power transmitter 116 and the wireless power receiver 126 may partially overlap or completely overlap each other along the normal direction of the second screen 122, so as to make the interval between the wireless power transmitter 116 and the wireless power receiver 126 as short as possible.

Although the present invention has been described in considerable detail with reference to certain embodiments thereof, other embodiments are possible. Therefore, the scope of the appended claims should not be limited to the description of the embodiments contained herein.

What is claimed is:

1. A mobile display system comprising:
   a first mobile display device comprising:
     a first power storage module;
     a first screen configured to display a first image by using power stored in the first power storage module; and
     a wireless power transmitter; and
   a second mobile display device comprising:
     a second power storage module;
     a second screen configured to display a second image by using the power stored in the second power storage module; and
     a wireless power receiver;
   wherein in a first charging mode, during a period when the first storage module is charged, the wireless power transmitter provides wireless power signal to the wireless power receiver, so as to char second power storage module by the first wireless power signal;
   wherein the second mobile display device further comprises a protective case configured to cover and protect the first mobile display device;
   wherein the second screen is disposed on a first side of the protective case, the wireless power receiver is disposed on a second side of the protective case adjacent to the first mobile display device, and the first side and the second side are opposite to each other.

2. The mobile display system as claimed in claim 1, wherein in a second charging mode, the wireless power transmitter provides a second wireless power signal to the wireless power receiver based on the power stored in the first power storage module, so as to charge the second power storage module by the second wireless power signal.

3. The mobile display system as claimed in claim 1, wherein the wireless power transmitter and the wireless power receiver are disposed opposing each other, so as to reduce an attenuation of the first wireless power signal.

4. A mobile display system comprising:
   a mobile display device comprising:
     a housing;

a first screen disposed on the housing;
a first battery disposed in the housing; and
a wireless power transmitter disposed in the housing; and a protective device comprising:
a protective case configured to cover he housing to protect the mobile display device;
a second screen disposed on a first side of he protective case;
a second battery disposed on the protective case; and
a wireless power receiver disposed on a second side of the protective case, wherein the first side and the second side are opposite to each other;
wherein an interval between the second screen and the mobile display device is greater than an interval between the wireless power receiver and the mobile display device.

5. The mobile display system as claimed in claim 4, wherein the wireless power transmitter and the wireless power receiver are disposed opposing each other, so as to reduce an attenuation between the wireless power transmitter and the wireless power receiver.

* * * * *